Oct. 26, 1937.    L. W. SNYDER    2,097,260
MULTIFOCAL LENS
Filed May 7, 1935

INVENTOR
Lester W. Snyder
BY
ATTORNEYS.

WITNESS:

Patented Oct. 26, 1937

2,097,260

UNITED STATES PATENT OFFICE 2,097,260

MULTIFOCAL LENS

Lester W. Snyder, Bala, Pa.

Application May 7, 1935, Serial No. 20,118

6 Claims. (Cl. 88—54)

This invention relates to improvements in multifocal lenses and specifically with reference to the provision of a trifocal lens formed of a plurality of sections of material, i. e., of the so-called fused type.

It is an object of this invention to provide a trifocal lens of the fused type in which the three portions of different focal length which are suitable for distance vision, intermediate vision and near or reading vision, respectively, will be positioned in those portions of the finished lens which will normally be used by the wearer for these different kinds of vision. It is another object of this invention to provide such a fused trifocal lens in which the optical centers of the three portions of different focal length lie closely adjacent each other so that there shall be a minimum of distortion of the image when the line of vision passes from a section of one focal length to a section of a different focal length.

It is a further object of this invention to provide a fused trifocal lens in which the lines of joinder between the respective sections of different focal length will be as nearly invisible as possible. Another object of this invention is to provide a fused trifocal lens which will be composed of only two different types of glass but which will, nevertheless, have perfectly smooth curvatures on each side of the finished lens.

Other objects and advantages of the trifocal lens in accordance with this invention will be apparent from the following detailed description of the accompanying drawing which represents a preferred embodiment of a trifocal lens in accordance with this invention and in which.

Figure 8:
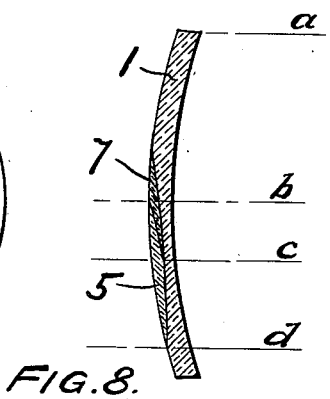
Fig. 8 is a section of the finished lens shown in Fig. 7.

As best shown in Fig. 8, the improved trifocal lens in accordance with this invention comprises a main body portion 1 and an inserted composite button 5 and 7. The major portion 1 is composed ordinarily of crown glass as is the segment 7 of the composite button. The segment 5 of the composite button, however, is formed of a glass having a higher index of refraction than crown glass, for example, flint glass, barium crown or other color-free glass. In this way a trifocal lens is provided in which the upper portion a—b is suitable for distance vision and the lowermost portion c—d is suitable for reading or other near vision work, while the intermediate portion b—c has an optical power between that of the other two portions and is suitable for intermediate vision.

Figure 1:
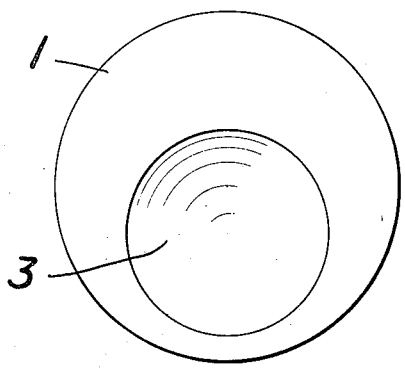
Fig. 1 is an elevation of a lens blank forming the major portion of the lens with a spherical depression ground therein.
Figure 2:
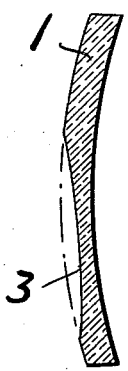
Fig. 2 is a sectional view of the lens blank shown in Fig. 1.
Figure 3:
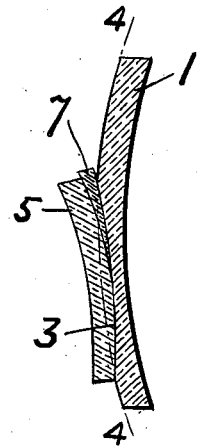
Fig. 3 is a sectional view of the lens blank shown in Fig. 2 with a composite button fused into place thereon.
Figure 4:
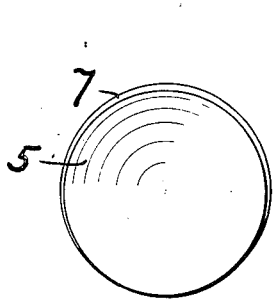
Fig. 4 is an elevation of the composite button in rough form used in accordance with this invention.
Figure 5:
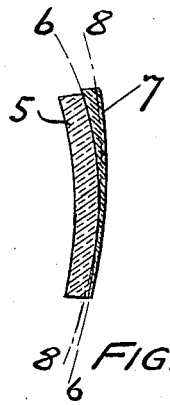
Fig. 5 is a section of the button shown in Fig. 4.
Figure 6:
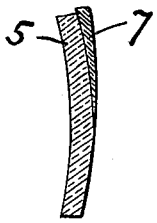
Fig. 6 is a sectional view of the button shown in Fig. 5 with one surface ground to the proper curvature.
Figure 7:
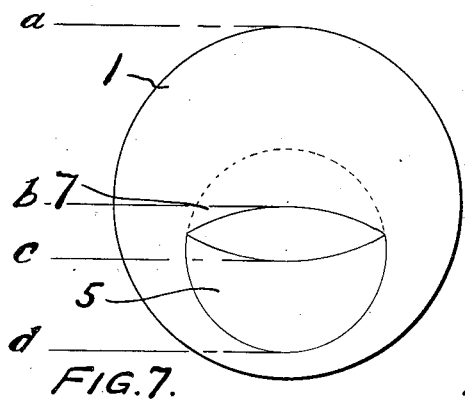
Fig. 7 is an elevation of the finished lens in accordance with this invention.

In the production of the lens in accordance with this invention a crown glass blank 1 has formed on one of its surfaces a spherical recess 3, which is ground and polished in the usual manner. A composite button, shown in Figs. 4 and 5 is then formed by fusing together, according to usual practice, a button 5 of flint glass and a wedge-shaped piece of crown glass 7, the contacting surfaces of which have been ground and polished to the spherical curvature indicated by the line 6—6. The piece of crown glass 7 will be of the same refractive power as the major blank 1 and desirably will be glass obtained from the same melt as the glass forming the major portion 1. The fused composite button will then be ground on the curve 8—8 to expose a greater surface of crown glass and a smaller surface of flint glass and polished to provide a finished button shown in Fig. 6. The line of curvature 8—8 is substantially that of the curvature of the spherical recess 3 in the major blank 1 and when the composite button shown in Fig. 6 is fused into the recess 3 by the usual procedure followed in making bifocal lenses, a perfect union between the polished surfaces will result. The resulting fused blank shown in Fig. 3 is then ground and polished on the curve 4—4 so as to expose surfaces of both crown and flint glass over the composite button portion to provide the finished lens shown in Figs. 7 and 8.

During the fusing operation which unites the button shown in Fig. 6 with the major blank 1, the section 7 of the button will merge completely with the body of the blank 1 since both are formed of the same glass. There will accordingly be no visible line of division between the segment 7 and the major portion 1 as shown in Figs. 3 and 8; but for the sake of clarity in describing the production of the lens the segment 7 and the major blank 1 have been indicated in the drawing as maintaining their identity throughout the operations.

The focal length of the reading portion c—d of the finished lens will be that provided by the curvature of the main or distance portion of the lens a—b plus that imparted by the inserted segment 5 of greater refractive index. This addition will be determined, for any given refractive index of the glass 5, by the curvature of the spherical depression 3. Accordingly by methods well known to the art a lens having any desired focal length in the distance portion a—b and in the reading portion c—d may be prepared. The focal length of the intermediate vision portion b—c will, in a similar manner, be determined by the curvature of the lens as a whole, plus the addition created by that portion of the inserted segment 5 of greater refractive index which lies between the lines b and c in Fig. 8. This addition will be determined, for any given refractive index of the glass 5, by the curvature of the boundary 6—6, as shown in Fig. 5, between the section 5 and the section 7 of the composite button. The focal length of the lens in the intermediate vision portion b—c will accordingly always be less than that of the reading portion c—d by a controlled amount depending on the differences in curvature between the spherical surfaces 6—6 and 8—8.

It will be appreciated that the width of the lune-shaped intermediate vision section b—c in the finished lens is also determined, at least in part, by the difference in curvature between the surfaces 6—6 and 8—8. In order that in lenses of different intermediate focal length and consequently having different values for the difference between curvature of 6—6 and 8—8, the width of the lune-shaped intermediate portion b—c may be substantially the same for the different lenses, it will be desirable to vary the angle of the intersection of the spherical surfaces 6—6 and 8—8. By varying this angle of intersection in accordance with the change in the values of the difference between the curvatures of these two surfaces, it will be possible within wide limits to keep the width of the lune-shaped intermediate vision section in all types of lenses in accordance with this invention, no matter what may be the requirements for the focal lengths of the different sections, substantially the same. In order to give the lune-shaped intermediate vision section sufficient width to make it optically usable, this angle of intersection between spherical surface 6—6 and 8—8 will, however, always be small, as shown in the drawing.

From the foregoing it will be apparent that there has been provided in accordance with this invention a trifocal lens of pleasing appearance in which the lines of joinder between the various sections of different focal length have been made as nearly invisible as possible and which, since the optical centers of the three different portions of the lens all lie close together, may be used by the wearer without objectionable jumps or distortion in the image when the line of vision passes the boundary of any one of the sections of different focal length. It will also be apparent that the lens in accordance with this invention will be readily and cheaply made, and yet may be produced with ease with widely varying focal lengths in any of the sections to suit the optical requirements of the wearer.

Essentially, in its preferred embodiment, the multifocal lens in accordance with this invention will comprise a major portion of, for example, crown glass, having a recess or countersink therein bounded by two intersecting spherical surfaces of different radii of curvature (the surfaces 6—6 and 8—8) and an insert of, for example, flint glass fused in the recess. The spherical boundary surfaces of this recess will moreover intersect each other at a small angle and on a curve passing through the lowermost point of the recess, and thus there will be formed only a single recess and not a plurality of recesses.

It will be appreciated that the details hereinbefore set forth are illustrative only and that they may be changed in many particulars without departing from the scope of this invention. It will be understood therefore that these details are in no way in limitation of the invention as herein broadly described and claimed.

What I claim and desire to protect by Letters Patent is:

1. A trifocal lens comprising a major portion of crown glass provided with a spherical recess in one face thereof in which is secured a composite button formed from crown and flint glass, each face of the composite button comprising a crown glass portion and a flint glass portion of unequal area, the boundary between the crown and flint glass in said button constituting a spherical surface of different radius of curvature from that of the spherical recess in the major portion and extending at a small angle to the boundary surface of said spherical recess, the face of the composite button in contact with the major portion having a crown glass portion greater in area than the flint glass portion and having a spherical surface of the same radius of curvature as that of the recess in the major portion, and the opposite face of the composite button having a flint glass portion greater in area than the crown glass portion and having a surface forming a part of a continuous curve extending over the major portion and the composite button.

2. A trifocal lens comprising a major portion of crown glass provided with a spherical recess in one face thereof in which is secured a composite button formed from crown and flint glass, each face of the composite button comprising a crown glass portion and a flint glass portion, the boundary between the crown and flint glass in said button constituting a spherical surface of different radius of curvature from that of the spherical recess in the major portion and extending at a small angle to the boundary surface of said spherical recess, the face of the composite button in contact with the major portion having a spherical surface of the same radius of curvature as that of the recess in the major portion, and the opposite face of the composite button having a surface forming a part of a continuous curve extending over the major portion and the composite button.

3. A trifocal lens comprising a major portion provided with a spherical recess in one face thereof in which is secured a composite button formed from glass of two different indices of refraction, one of which has the same index of refraction as the glass forming the major portion, each face of the composite button comprising portions of the two glasses, the boundary between the two glasses in said composite button constituting a spherical surface of different radius of curvature from that of the spherical recess in the major portion and extending at a small angle to the boundary surface of said spherical recess, the face of the button in contact with the major portion having a spherical surface of the same radius of curvature as that of the recess in the major portion, and the opposite face of the button having a surface forming a part of a continuous curve extending over the major and the button.

4. A multifocal lens comprising a major portion having a spherical recess in one face thereof in which is secured a composite button formed from glass of two different indices of refraction, each face of the button comprising portions of the two glasses, the boundary between the two glasses in said composite button constituting a spherical surface of different radius of curvature from that of the spherical recess in the major portion and extending at a small angle to the boundary surface of said spherical recess, the face of the button in contact with the major portion having a spherical surface of the same radius of curvature as that of the recess in the major portion, and the opposite face of the button having a surface forming a part of a continuous curve extending over the major portion and the button.

5. A trifocal lens comprising a main lens body provided with a recess in one face thereof bounded by two spherical surfaces of different radii of curvature intersecting each other at a small angle on a curve passing through the lowermost point of said recess, and an insert of glass of higher refractive index than the main lens body secured in said recess, the lens having a continuous curve over the main lens body and the insert.

6. A trifocal lens comprising a main lens body of crown glass provided with a recess in one face thereof bounded by two spherical surfaces of different radii of curvature intersecting each other at a small angle on a curve passing through the lowermost point of said recess, and an insert of flint glass secured in said recess, the lens having a continuous curve over the main lens body and the insert.

LESTER W. SNYDER.